United States Patent
Briggs et al.

(10) Patent No.: US 10,572,238 B2
(45) Date of Patent: *Feb. 25, 2020

(54) COMPUTER UPDATE SCHEDULING BASED ON BIOMETRICS

(71) Applicant: International Business Machines Corporation, Armonk, NY (US)

(72) Inventors: Simon A. Briggs, Winchester (GB); Alfonso Perianez Gomez, Hursley (GB); Michal G. Parusinski, Southampton (GB); Adam C. Roberts, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/396,838

(22) Filed: Jan. 3, 2017

(65) Prior Publication Data

US 2017/0109155 A1  Apr. 20, 2017

Related U.S. Application Data

(63) Continuation of application No. 14/798,272, filed on Jul. 13, 2015, now Pat. No. 9,582,263.

(51) Int. Cl.
  *G06F 8/65* (2018.01)
  *G06F 9/48* (2006.01)
  *H04L 29/06* (2006.01)

(52) U.S. Cl.
  CPC .............. *G06F 8/65* (2013.01); *G06F 9/4881* (2013.01); *H04L 63/10* (2013.01)

(58) Field of Classification Search
  CPC .................................. G06F 8/65; G06F 9/4481
  (Continued)

(56) References Cited

U.S. PATENT DOCUMENTS

| 6,279,153 B1 * | 8/2001 | Bi | H04L 67/06 717/171 |
| 8,321,858 B1 * | 11/2012 | Marmaros | G06F 8/65 717/173 |

(Continued)

OTHER PUBLICATIONS

IBM: List of IBM Patents or Patent Applications Treated as Related (Appendix P), Jan. 3, 2017, pp. 1-2.

(Continued)

*Primary Examiner* — Lewis A Bullock, Jr.
*Assistant Examiner* — Theodore E Hebert
(74) *Attorney, Agent, or Firm* — Sean M. Douglass

(57) ABSTRACT

Embodiments of the present invention relate to scheduling updates on a personal electronic device based on biometric data gathered from a user. The personal electronic device, or another computing device, may receive a pending software update. The personal electronic device, or another computing device, may receive biometric data of the user from one or more biometric sensors. The biometric data may provide sufficient information to determine a sleep status of the user. The personal electronic device, or another computing device, may determine a sleep status of the user. The personal electronic device, or another computing device, may install the pending software update in response to determining that the user is sleeping. The personal electronic device, or another computing device, may delay the pending software update in response to determining that the user is not sleeping.

20 Claims, 5 Drawing Sheets

(58) Field of Classification Search
USPC .......................................................... 717/168
See application file for complete search history.

(56) References Cited

U.S. PATENT DOCUMENTS

| | | | |
|---|---|---|---|
| 8,887,151 B2 | 11/2014 | Dugan | |
| 9,306,899 B1* | 4/2016 | Vendrow | H04L 51/34 |
| 2002/0129107 A1* | 9/2002 | Loughran | G06F 8/65 |
| | | | 709/206 |
| 2003/0041127 A1* | 2/2003 | Turnbull | G06F 8/65 |
| | | | 709/220 |
| 2005/0190393 A1* | 9/2005 | Bledsoe | G06F 8/65 |
| | | | 358/1.13 |
| 2006/0069769 A1* | 3/2006 | Dacosta | H04L 29/06027 |
| | | | 709/224 |
| 2008/0294798 A1* | 11/2008 | Lynch | H04M 1/72563 |
| | | | 709/248 |
| 2009/0327390 A1* | 12/2009 | Tran | G06F 9/4843 |
| | | | 709/201 |
| 2011/0230790 A1* | 9/2011 | Kozlov | A61B 5/4812 |
| | | | 600/595 |
| 2012/0047498 A1* | 2/2012 | Motta | G06F 8/65 |
| | | | 717/171 |
| 2012/0272230 A1* | 10/2012 | Lee | G06F 1/329 |
| | | | 717/173 |
| 2012/0315880 A1 | 12/2012 | Peitrow et al. | |
| 2013/0138776 A1* | 5/2013 | Yamashita | H04L 67/06 |
| | | | 709/219 |
| 2013/0154838 A1 | 6/2013 | Alameh et al. | |
| 2013/0261404 A1* | 10/2013 | Sato | A61B 5/4806 |
| | | | 600/300 |
| 2014/0039842 A1* | 2/2014 | Yuen | A61B 5/6838 |
| | | | 702/189 |
| 2014/0171146 A1 | 6/2014 | Ma et al. | |
| 2014/0218369 A1* | 8/2014 | Yuen | A61B 5/6838 |
| | | | 345/440 |
| 2014/0277822 A1* | 9/2014 | Nunn | A61B 5/6892 |
| | | | 700/301 |
| 2015/0007157 A1 | 1/2015 | Park et al. | |
| 2015/0121356 A1* | 4/2015 | Yang | G06F 8/65 |
| | | | 717/168 |
| 2016/0100696 A1* | 4/2016 | Palashewski | A47C 31/00 |
| | | | 700/90 |
| 2016/0128104 A1* | 5/2016 | Logue | H04W 76/10 |
| | | | 370/329 |

OTHER PUBLICATIONS

Briggs, et al., U.S. Appl. No. 14/798,272, filed Jul. 13, 2015, titled "Computer Update Scheduling Based on Biometrics," pp. 1-32.

"Ketarin—Keep your setup packages up to date", http://ketarin.canneverbe.com/, accessed Apr. 7, 2015, pp. 1-2.

Mell et al., "The NIST Definition of Cloud Computing", National Institue of Standards and Technology, Special Publication 800-145, Sep. 2011, pp. 1-7.

* cited by examiner

COMPUTER UPDATE SCHEDULING BASED ON BIOMETRICS

BACKGROUND

The present invention relates generally to the field of personal electronic devices, and more particularly to scheduling updates on a personal electronic device based on biometric data gathered from a user.

Software updates on personal electronic devices may consume substantial memory resources, deteriorating the user's experience. Some conventional devices perform software updates during the night when the user is presumed asleep. However, when this assumption fails, the user's experience may still be deteriorated. Therefore, a method for scheduling software updates based on more than merely a time of day is needed to avoid deteriorating the user's experience.

SUMMARY

Embodiments of the present invention disclose a method for scheduling updates on a personal electronic device based on biometric data gathered from a user. The personal electronic device, or another computing device, may receive a pending software update. The personal electronic device, or another computing device, may receive biometric data of the user from one or more biometric sensors. The biometric data may provide sufficient information to determine a sleep status of the user. The personal electronic device, or another computing device, may determine a sleep status of the user. The personal electronic device, or another computing device, may install the pending software update in response to determining that the user is sleeping. The personal electronic device, or another computing device, may delay the pending software update in response to determining that the user is not sleeping.

Embodiments of the present invention disclose a computer program product for scheduling updates on a personal electronic device based on biometric data gathered from a user. The personal electronic device, or another computing device, may receive a pending software update. The personal electronic device, or another computing device, may receive biometric data of a user from one or more biometric sensors. The biometric data may provide sufficient information to determine a sleep status of the user. The personal electronic device, or another computing device, may determine a sleep status of the user. The personal electronic device, or another computing device, may install the pending software update in response to determining that the user is sleeping. The personal electronic device, or another computing device, may delay the pending software update in response to determining that the user is not sleeping.

Embodiments of the present invention disclose a system for scheduling updates on a personal electronic device based on biometric data gathered from the user. The personal electronic device, or another computing device, may receive a pending software update. The personal electronic device, or another computing device, may receive biometric data of the user from one or more biometric sensors. The biometric data may provide sufficient information to determine a sleep status of the user. The personal electronic device, or another computing device, may determine a sleep status of the user. The personal electronic device, or another computing device, may install the pending software update in response to determining that the user is sleeping. The personal electronic device, or another computing device, may delay the pending software update in response to determining that the user is not sleeping.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Embodiments of the present invention may schedule updates on a personal electronic device based on biometric data gathered from a user. Software updates on personal electronic devices may consume substantial memory resources, deteriorating a user's experience. Some conventional devices perform software updates at night when a user is presumed asleep. However, when this assumption fails, the user's experience may still be deteriorated. Therefore, a method for scheduling software updates based on more than merely a time of day is needed to avoid deteriorating the user's experience.

Embodiments of the present invention may schedule updates on a personal electronic device based on biometric data gathered from a user. Embodiments of the present invention will now be described in detail with reference to FIGS. 1-5.

Figure 1:
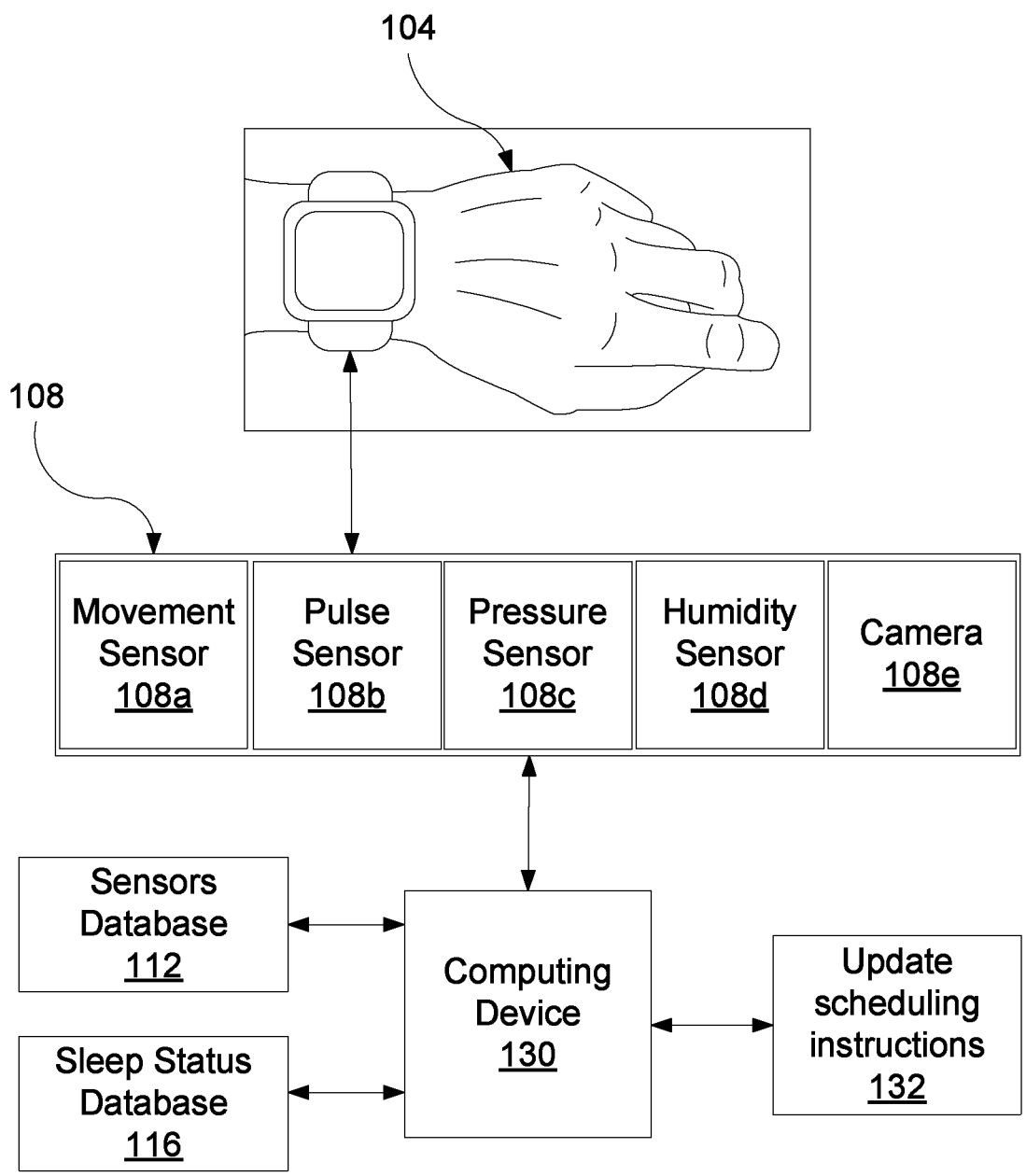
FIG. 1 is a schematic block diagram depicting an update scheduling system, in accordance with an embodiment of the present invention.

FIG. 1 is an update scheduling system 100, according to an aspect of the invention. In an exemplary embodiment, the update scheduling system 100 may include a user 104, one or more biometric sensors 108 (hereinafter "biometric sensors"), system 130, sensors database 112, sleep status database 116, and update scheduling instructions 132. The biometric sensors 108 may include, for example, a movement sensor 108*a*, pulse sensor 108*b*, pressure sensor 108*c*, humidity sensor 108*d*, camera 108*e*, or any combination thereof. In an embodiment, the biometric sensors 108 may be contained in a wearable device, such as, for example, a watch, wrist band, necklace, anklet, glasses, contact lenses, clothing, or any combination thereof. In another embodiment, the biometric sensors 108 may be part of a separate device, such as, for example, a mobile computing device, laptop computer, desktop computer, pillow, bed sheets, mattress, bed frame, alarm clock, a dedicated biometric sensing device, or any combination thereof. Computing device 130 may be a laptop computer, tablet computer, netbook computer, personal computer (PC), desktop computer, mobile phone, or any programmable electronic device. Computing device 130 may include internal and external hardware components, as depicted and described in further detail with respect to FIG. 3. Computing device 130 may include update scheduling instructions 132. The update scheduling instructions 132 may be a program, function, or module of a computer program (not shown) executable by a processor of the update scheduling system 100, or may be embodied as one or more connected computing systems.

The biometric sensors 108 may detect biological data from the user 104. In an embodiment, the biometric sensors 108 may transmit the user's 104 biological data directly to the computing device 130. In another embodiment, the biometric sensors 108 and the computing device 130 may be a part of the same device. For example, the biometric sensors 108 and the computing device 130 may be a smart watch. In another embodiment, the biometric sensors 108 may transmit the user's 104 biological data to an intervening computing device and the intervening computing device may transmit the biological data to the computing device 130. For example, the intervening computing device may be a cloud computing device. The computing device 130 may compare the user's 104 biological data with information stored within the sensors database 112 and/or the sleep status database 116. The sensors database 112 may provide the computing device 130 with information regarding capabilities of the biometric sensors 108. The sleep status database 116 may provide the computing device 130 with information indicating the kinds of biological data that may suggest the user 104 may be asleep. The computing device 130 may utilize information obtained from the sensors database 112, the sleep status database 116, and the user's 104 biological information to determine whether or not the user 104 is sleeping. If the user 104 is sleeping, the computing device 130 may utilize the update scheduling instructions 132 to determine when to schedule a pending software update, as discussed with reference to FIG. 2. Update scheduling system 100 may be implemented using a computing node such as the computing node of FIG. 3.

Figure 2:
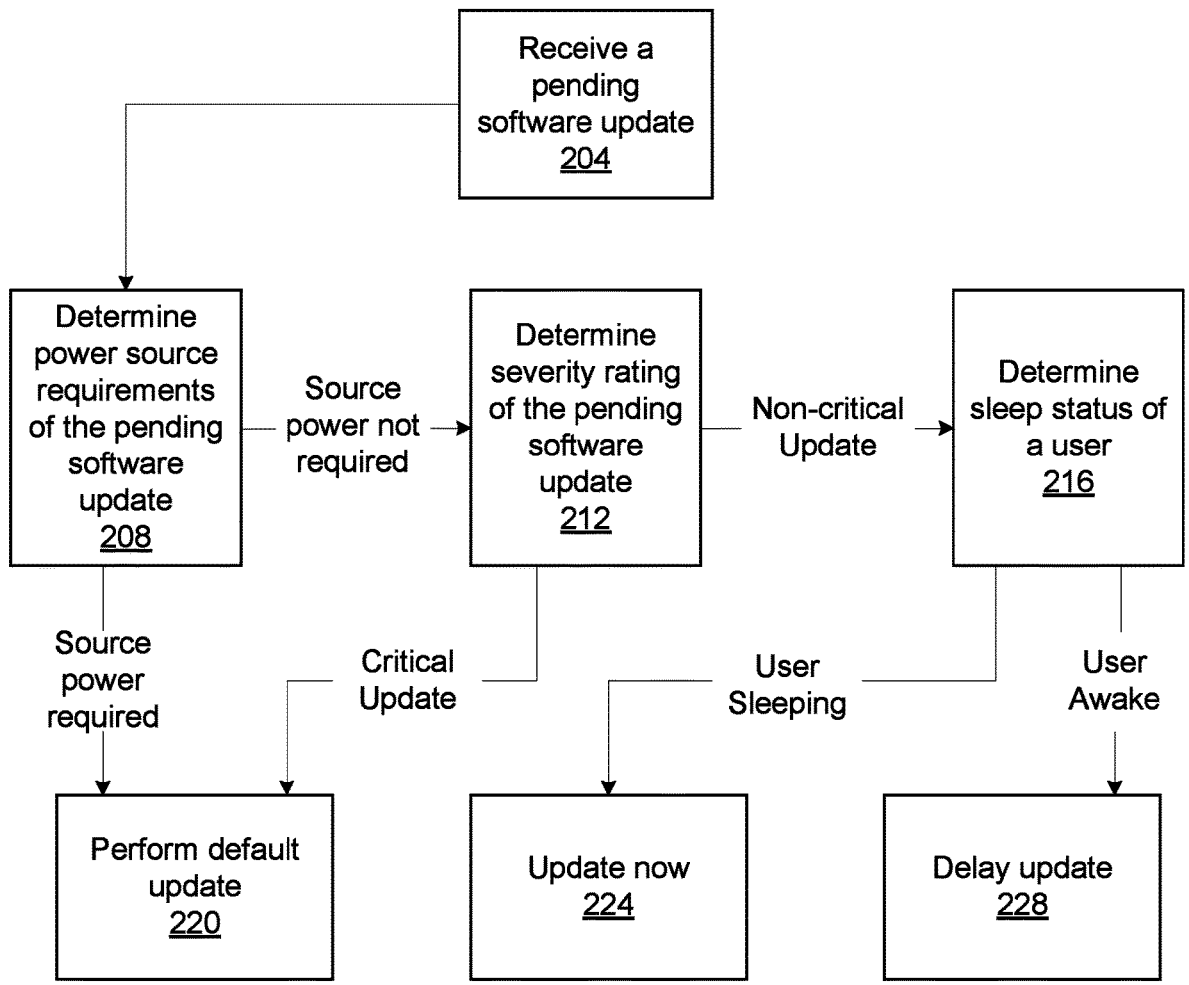
FIG. 2 is a flowchart depicting steps of a method for scheduling updates in an update scheduling system, in accordance with an embodiment of the present invention.

FIG. 2 is a flowchart of a method 200 for scheduling software updates on a personal electronic device, using the update scheduling system 100 of FIG. 1, in accordance with an embodiment of the present invention. Steps of method 200 may be executed using a processor of a computer that encompasses, or is part of, update scheduling system 100, or another system. In an embodiment, a method for scheduling software updates on a personal electronic device may involve one or more of: receiving a pending software update 204 (hereinafter "receiving a pending software update", "receive a pending software update", "receiving the pending software update", or "receive the pending software update"), determining power source requirements 208 (hereinafter "determining power source requirements" or "determine power source requirements"), determining severity rating 212 (hereinafter "determining severity rating" or "determine severity rating"), determining user sleep status 216 (hereinafter "determining user sleep status" or "determine user sleep status"), performing default update 220 (hereinafter "performing default update" or "perform default update"), updating now 224 (hereinafter "updating now" or "update now"), and delaying update 228 (hereinafter "delaying update" or "delay update"). Each step is discussed in detail below.

Receiving a pending software update 204 may be a first step in determining when to schedule the pending software update. The pending software update may be transmitted to the personal electronic device using any communications technology known in the art, such as, for example, a Bluetooth device, WiFi device, near-field communication (NFC) device, radio frequency device, Long Term Evolution (LTE) device, or any combination thereof. The pending software update may be received by the personal electronic device using any communications technology known in the art, such as, for example, a Bluetooth device, WiFi device, near-field communication (NFC) device, radio frequency device, Long Term Evolution (LTE) device, or any combination thereof. The pending software update may be sent and received using one or more compatible communications technologies.

Determining power source requirements 208 may involve reading the requirements provided with the pending software update, analyzing the pending software update, and/or comparing the pending software update to one or more known software updates. The pending software update may provide power source requirements. For example, the pending update may indicate that a power source is required or that a power source is not required. If the pending software update indicates whether or not a power source is required, determining power source requirements 208 may be accomplished by reading the requirements provided by the pending software update. In an embodiment, the pending software update may be analyzed to estimate a download and/or installation time. One or more parameters may be used to estimate a download and/or installation time, such as, for example, size, complexity, compatibility, number of updates, security level, etc. An estimated download and/or installation time may be used to determine power requirements for the pending software update. In the event that power requirements of the pending software update exceed available energy stored in the device, a power source may be required. In another embodiment, the pending software update may be compared to one or more known software updates. For example, the one or more known software updates may have known power requirements. By comparing the pending software update to the one or more known software updates, a closest match may be determined. The one or more known software updates with the closest match to the pending software update may be used to estimate power requirements for the pending software update.

Determining severity rating 212 may involve reading the requirements provided with the pending software update, analyzing the pending software update, and/or comparing the pending software update to one or more known software updates. Severity ratings may be used to describe the likelihood of functioning exploit code being developed for vulnerabilities addressed by software updates. In one example, severity ratings for software updates may include critical, important, moderate, and low. A severity rating of critical may include a vulnerability whose exploitation could allow code execution without user interaction. A severity rating of important may include a vulnerability which could compromise confidentiality, integrity, or availability of user data or processing resources. A severity rating of moderate may include a vulnerability whose impact is mitigated to a significant degree. A severity rating of low may include a vulnerability whose impact is comprehensively mitigated.

Determining user sleep status 216 may include gathering biometric information from the user 104 and analyzing the biometric information gathered from the user 104. Biometric information may be acquired from the biometric sensors 108, discussed above with reference to FIG. 1. The biometric sensors 108 may provide one or more type of biometric data, such as, for example, motion measurements, pulse measurements, blood pressure measurements, humidity measurements, images, or any combination thereof. In an embodiment, the computing device 130, discussed above with reference to FIG. 1, may analyze data acquired from the biometric sensors 108 to determine whether the user 104 is sleeping or awake. For example, the computing device 130 may compare biometric data from the user 104 with biometric data of an awake user and/or a sleeping user. In another example, the computing device 130 may compare biometric data from the user 104 with biometric data from a time when the user 104 was known to be sleeping and/or when the user 104 was known to be awake. If the computing device 130 determines that the user 104 is sleeping, update now 224, discussed below, may be performed. If the computing device 130 determines that the user 104 is awake, delaying update 228, discussed below, may be performed. If the computing device 130 determines that the user 104 is sleeping followed by determining that the user 104 is awake, the computing device 130 may, for example, perform one or more of updating now 224, delaying update 228, performing a default update 220, asking the user to select an option, or any combination thereof.

Performing a default update 220 may include utilizing one or more default settings to determine whether or not to perform an update. For example, the computing device 130 may include default settings which may involve asking the user 104 whether or not to perform an update. In another example, the computing device 130 may include default setting which may involve automatically performing an update at a certain time of day (e.g. at night). In another example, the computing device 130 may include default settings which may involve performing an update when a particular connection is detected (e.g. WiFi).

Updating now 224 may include promptly initiating a download and/or installation of a pending software update. In an embodiment, updating now 224 may involve a download of a pending software update. A download may include, for example, a complete download, partial download, a re-download, or any combination thereof. In another embodiment, updating now 224 may involve an installation of a pending software update. An installation may include, for example, a complete installation, partial installation, re-installation, or any combination thereof. In another embodiment, a pending software update may require a download and an installation. In an embodiment, once the computing device 130 determines that the user 104 is sleeping the update now 224 is performed. In an embodiment, if the update now 224 begins followed by determining that the user 104 is awake while the download and/or installation is in progress, the computing device 130 may, for example, perform one or more of updating now 224, delaying update 228, performing a default update 220, asking the user 104 to select an option, or any combination thereof. In a preferred embodiment, if a download and/or installation is nearly complete when the user 104 is determined to be awake, the updating now 224 may continue until the download and/or installation is completed. In a preferred embodiment, if a download and/or installation may take substantial time (e.g. more than a half hour) to complete, the user 104 may be provided with a prompt permitting the user 104 to select whether to continue or delay the update.

Delaying update 228 may include postponing a download and/or installation of a pending software update. In an embodiment, delaying update 228 may be performed when the computing device 130 determines that the user 104 is awake. Postponing an update while the user 104 is awake may reserve processing resources for other computing activities while the user 104 is awake. In an embodiment, delaying update 228 may terminate after a predetermined period of time. In an embodiment, the predetermined period of time may be a predetermined period of time following an event, such as, for example, the last time biometric data indicating the user 104 is awake was received, the last time the user 104 interacted with the computing device 130, or any combination thereof. The predetermined period of time may range from approximately 1 nanosecond to approximately 1 week, and ranges therebetween. Nonlimiting examples of ranges therebetween include, for example, 1 millisecond to 1 second, 30 seconds to 20 minutes, 30 minutes to 3 hours, 1 hour to 2 hours, 4 hours to 2 days, etc. In another embodiment, delaying update 228 may be terminated when the computing device 130 determines that the user 104 is sleeping. The delaying update 228 may be terminated when the computing device 130 performs another action, such as, for example, updating now 224, delaying update 228, performing a default update 220, asking the user 104 to select an option, or any combination thereof. In a preferred embodiment, when the computing device 130 determines that the user 104 is sleeping, the delaying update 228 may be terminated and the updating now 224 may be performed.

Figure 3:
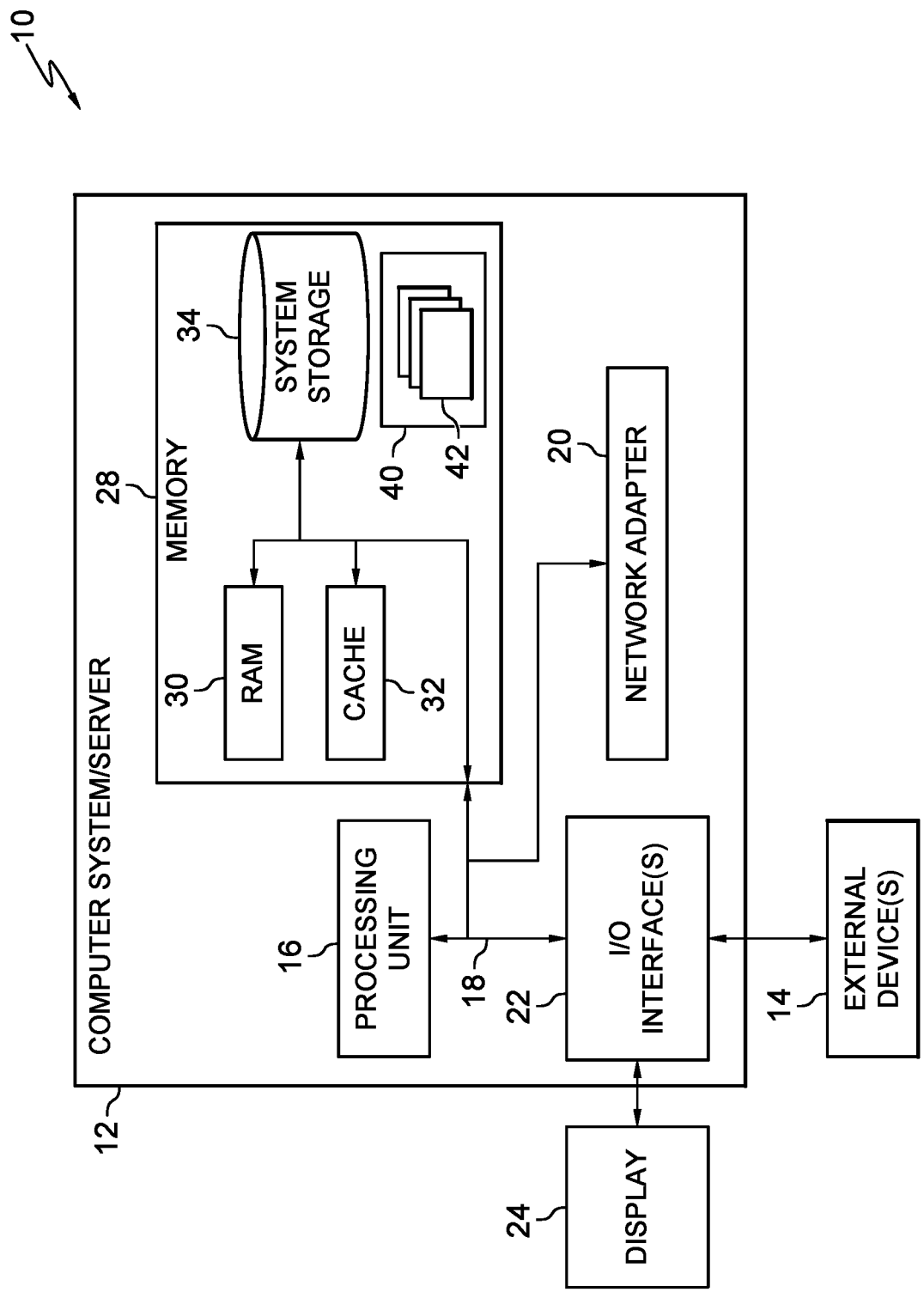
FIG. 3 is a schematic block diagram illustrating a computer system, in accordance with an embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user 104 to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
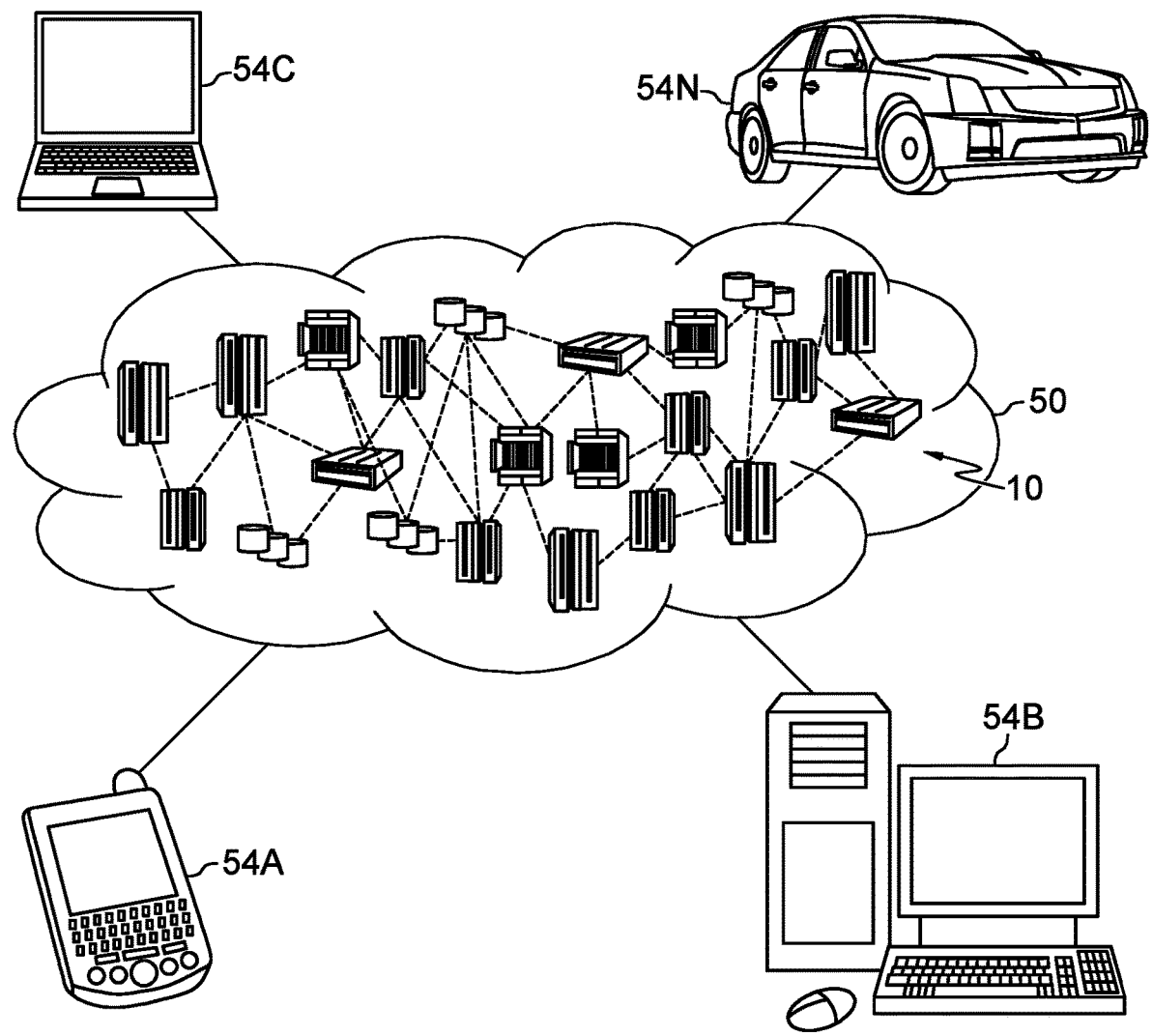
FIG. 4 is a schematic block diagram depicting an exemplary cloud computing environment, in accordance with an embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 5:
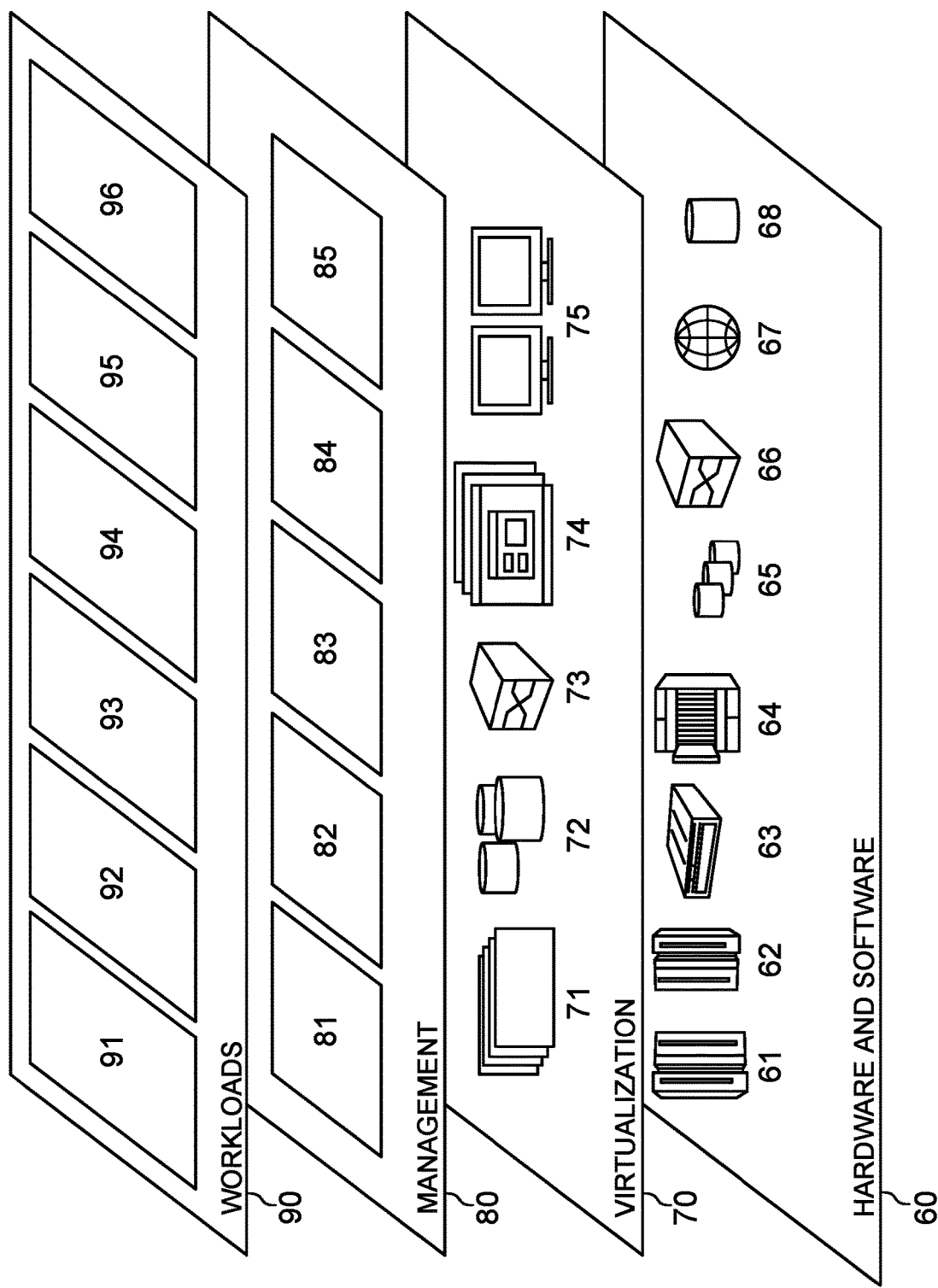
FIG. 5 is a schematic block diagram depicting a multi-layer functional embodiment of the cloud computing environment of FIG. 5, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User 104 portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software update services 96 (such as those provided by embodiments of the invention described in connection with FIGS. 1-3).

In a related embodiment, cloud migration services may be performed as part of management layer 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for scheduling updates on a personal electronic device, the method comprising:
   receiving, by the personal electronic device, a pending software update;
   receiving biometric data of a user from one or more biometric sensors to determine a sleep status of the user;
   determining the sleep status of the user based on the biometric data of the user; and
   performing one of:
      initiating the pending software update on the personal electronic device promptly in response to the biometric data of the user indicating that the user is actively sleeping; and
      delaying initiation of the pending software update on the personal electronic device in response to the biometric data of the user indicating that the user is awake.

2. The method of claim 1, further comprising:
   determining a severity rating of the pending software update; and
   performing one of:
      utilizing a default update installation policy in response to determining the severity rating of the pending software update is critical;
      delaying initiation of the pending software update in response to determining that the pending software update is not critical.

3. The method of claim 1, further comprising:
   determining power source requirements of the pending software update; and
   performing one of:
      utilizing a default update installation policy in response to determining a power source is required by the pending software update;
      delaying initiation of the pending software update in response to determining that a power source is not required by the pending software update.

4. The method of claim 1, wherein the delaying initiation of the pending software update terminates when the sleep status of the user changes to sleeping.

5. The method of claim 1, wherein the delaying initiation of the pending software update terminates when a predetermined period of time elapses.

6. The method of claim 1, wherein the delaying initiation of the pending software update terminates when the user initiates a download and/or installation of the pending software update.

7. The method of claim 1, wherein the initiating the pending software update terminates upon the occurrence of one or more of the following:
   the biometric data of the user indicates that the sleep status of the user changes to awake; and
   the user requests to terminate the installing of the pending software update.

8. A computer program product for scheduling updates on a personal electronic device, the computer program product comprising a computer readable storage medium having program instructions embodied therewith, wherein the computer readable storage medium is not a transitory signal per se, the program instructions executable by a computer to cause the computer to perform a method comprising:
   receiving, by the personal electronic device, a pending software update;
   receiving biometric data of a user from one or more biometric sensors, wherein the biometric data provides sufficient information to determine a sleep status of the user;
   determining a the sleep status of the user based on the biometric data of the user; and
   performing, by a computer, one of:
      initiating the pending software update on the personal electronic device promptly in response to the biometric data of the user indicating that the user is actively sleeping; and
      delaying initiation of the pending software update on the personal electronic device in response to the biometric data of the user indicating that the user is awake.

9. The computer program product of claim 8, further comprising:
   determining a severity rating of the pending software update; and
   performing one of:
      utilizing a default update installation policy in response to determining the severity rating of the pending software update is critical;
      delaying initiation of the pending software update in response to determining that the severity rating of the pending software update is not critical.

10. The computer program product of claim 8, further comprising:
    determining power source requirements of the pending software update; and
    performing one of:
       utilizing a default update installation policy in response to determining a power source is required by the pending software update;
       delaying initiation of the pending software update in response to determining that a power source is not required by the pending software update.

11. The computer program product of claim 8, wherein the delaying initiation of the pending software update terminates when the sleep status of the user changes to sleeping.

12. The computer program product of claim 8, wherein the delaying initiation of the pending software update terminates when a predetermined period of time elapses.

13. The computer program product of claim 8, wherein the delaying initiation of the pending software update terminates when the user initiates a download and/or installation of the pending software update.

14. The computer program product of claim 8, wherein the initiating the pending software update terminates upon the occurrence of one or more of the following:

the biometric data of the user indicates that the sleep status of the user changes to awake; and the user requests to terminate the installing of the pending software update.

15. A computer system for scheduling updates on a personal electronic device, the computer system comprising:

one or more computer processors;

one or more computer-readable storage media;

program instructions stored on the computer-readable storage media for execution by at least one of the one or more processors, the program instructions comprising:

instructions to receive, by the personal electronic device, a pending software update;

instructions to receive biometric data of a user from one or more biometric sensors, wherein the biometric data provides sufficient information to determine a sleep status of the user;

instructions to determine the sleep status of the user based on the biometric data of the user; and instructions to perform one of:

initiating the pending software update on the personal electronic device promptly in response to the biometric data of the user indicating that the user is actively sleeping; and delaying initiation of the pending software update on the personal electronic device in response to the biometric data of the user indicating that the user is awake.

16. The system of claim 15, further comprising:

instructions to determine a severity rating of the pending software update; and instructions to perform one of:

utilizing a default update installation policy in response to determining the severity rating of the pending software update is critical;

delaying initiation of the pending software update in response to determining that the severity rating of the pending software update is not critical.

17. The system of claim 15, further comprising:

instructions to determine power source requirements of the pending software update; and instructions to perform one of:

utilizing a default update installation policy in response to determining a power source is required by the pending software update;

delaying initiation of the pending software update in response to determining that a power source is not required by the pending software update.

18. The system of claim 15, wherein the delaying initiation of the pending software update terminates when the biometric data of the user indicates that the sleep status of the user changes to sleeping.

19. The system of claim 15, wherein the delaying initiation of the pending software update terminates when a predetermined period of time elapses.

20. The system of claim 15, wherein the delaying initiation of the pending software update terminates when the user initiates a download and/or installation of the pending software update.

* * * * *